United States Patent
Kmiecik et al.

(10) Patent No.: US 8,725,404 B2
(45) Date of Patent: May 13, 2014

(54) METHOD FOR UPDATING DIGITAL MAPS USING ALTITUDE INFORMATION

(75) Inventors: Marcin Michal Kmiecik, Lodz (PL); Wojciech Tomasz Nowak, Konstantynow Lodzki (PL)

(73) Assignee: TomTom Polska Sp. z o.o., Warsaw (PL)

(*) Notice: Subject to any disclaimer, the term of this patent is extended or adjusted under 35 U.S.C. 154(b) by 109 days.

(21) Appl. No.: 13/256,463

(22) PCT Filed: Dec. 31, 2009

(86) PCT No.: PCT/EP2009/068053
§ 371 (c)(1),
(2), (4) Date: Sep. 14, 2011

(87) PCT Pub. No.: WO2010/105714
PCT Pub. Date: Sep. 23, 2010

(65) Prior Publication Data
US 2012/0004845 A1    Jan. 5, 2012

Related U.S. Application Data

(60) Provisional application No. 61/202,585, filed on Mar. 16, 2009.

(51) Int. Cl.
*G01C 21/00* (2006.01)

(52) U.S. Cl.
USPC ............ 701/400; 701/409; 701/445; 701/532

(58) Field of Classification Search
USPC .......... 701/400, 409, 532, 445; 707/602, 603, 707/609
See application file for complete search history.

(56) References Cited

U.S. PATENT DOCUMENTS

| | | |
|---|---|---|
| 2003/0069694 A1 | 4/2003 | Fuchs et al. |
| 2009/0322607 A1 | 12/2009 | Mitsunaga |
| 2012/0197839 A1* | 8/2012 | Vervaet et al. ................ 707/609 |

FOREIGN PATENT DOCUMENTS

| | | |
|---|---|---|
| EP | 1 726 971 A1 | 11/2006 |
| JP | 99/57575 A2 | 11/1999 |
| JP | 2008 292454 A | 12/2008 |

OTHER PUBLICATIONS

International Search Report issued on May 3, 2010 for International Application No. PCT/EP2009/068053.
Bruntrup R et al: "Incremental map generation with GPS traces" Intelligent Transportation Systems, 2005. Proceedings. 2005 IEE~ Vienna, Austria Sep. 13-16, 2005, Piscataway, NJ, USA,IEEE LNKD- DOI:10.1109/ITSC.2005.15200B4, Sep. 13, 2005, XP010B43059.

* cited by examiner

*Primary Examiner* — Gertrude Arthur Jeanglaude (57) ABSTRACT

This invention relates to a method for updating digital maps and for matching global navigation devices to a digital map. Such navigation devices rely upon GPS signals (20, 24) from satellites (22, 26). One well-documented cause of position error in navigation devices arises from the phenomenon of GPS multi-path. It has been observed that GPS multi-path errors in the latitude/longitude direction are highly correlated with errors in altitude. By comparing altitude value of GPS probe data with reference specifications for altitude, unreliable probe data (outliers) can be easily identified and culled. Such techniques can be used as well by a mobile navigation device to confirm a match to a particular road segment and if not revert to other positioning techniques such as inertial guidance systems and the like. If the local altitude is not reliably known, an estimation can be derived directly from the collected probe data.

15 Claims, 13 Drawing Sheets

METHOD FOR UPDATING DIGITAL MAPS USING ALTITUDE INFORMATION

CROSS REFERENCE TO RELATED APPLICATIONS

This application is the National Stage of International Application No. PCT/EP2009/068053, filed Dec. 31, 2009 and designating the United States. The entire contents of this application is incorporated herein by reference.

This application claims the benefit of priority from U.S. Application No. 61/202,585, filed Mar. 16, 2009. The entire contents of this application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to digital maps of the type for displaying road or pathway information, and more particularly toward a method for updating information contained in a digital map using reliable probe data as well as a method for matching a mobile navigation device to a digital map using only reliable GPS data.

2. Related Art

Figure 1:
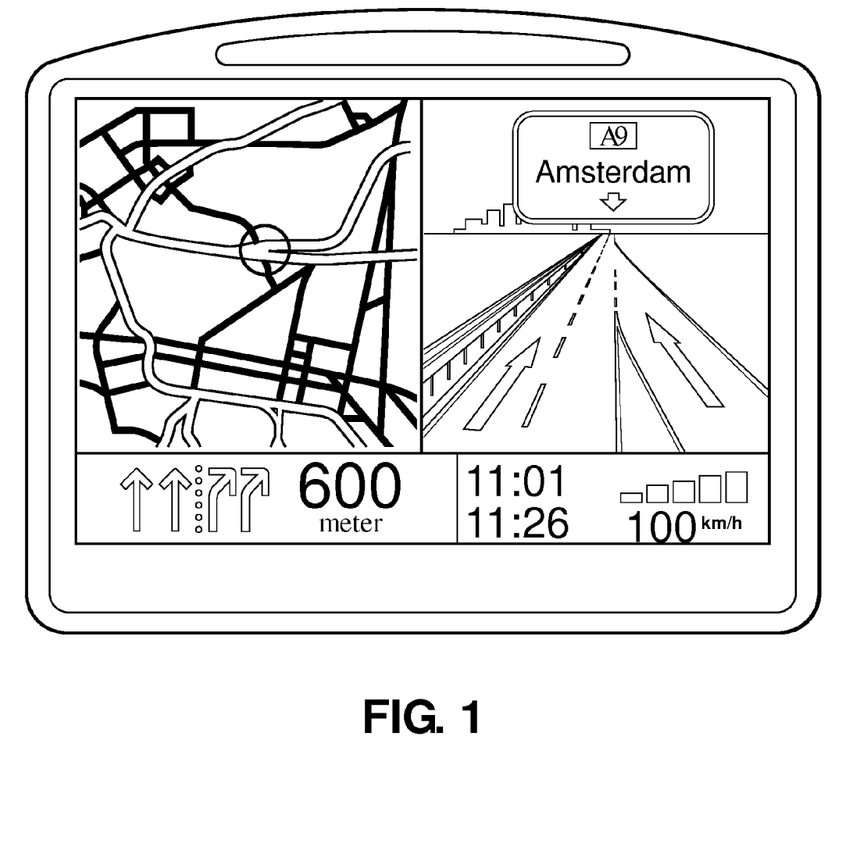
FIG. 1 is an enlarged, exemplary view of a compact, portable navigation system according to the subject invention including an enlarged frontal display screen for presenting map data information to a vehicle driver.

Personal navigation devices like that shown for example in FIG. 1 utilize digital maps combined with accurate positioning data from GPS or other data streams. These devices have been developed for commuters seeking navigation assistance, for businesses trying to minimize transportation costs, and many other applications. The effectiveness of such navigation systems in inherently dependent upon the accuracy and completeness of the information provided to it in the form of digital maps and associated attribute data. Likewise, the effectiveness of such navigation systems is also dependent upon accurately and quickly matching the actual, real-world location of the navigation device to a corresponding portion of the digital map. Typically, the navigation system includes a small display screen or graphic user interface that portrays a network of streets as a series of line segments, including a center line running approximately along the center of each street or path, as exemplified in FIG. 1. The traveler can then be generally located on the digital map close to or with regard to that center line. Such GPS-enabled personal navigation devices, such as those manufactured by TomTom N.V. (www.tomtom.com) may be also configured with probes to generate probe data points. Of course, other suitable devices may be used to generate probe data points including handheld devices, mobile phones, PDAs, and the like.

Digital maps are expensive to produce and update, since exhibiting and processing road information is very costly. Surveying methods or digitizing satellite images have been employed in the past for creating digital maps, but are prone to the introduction of inaccuracies or systematic errors due to faulty or inaccurate input sources or flawed inference procedures. Once a digital map has been created, it is costly to keep map information up to date, since road geometry changes over time.

Figure 2:
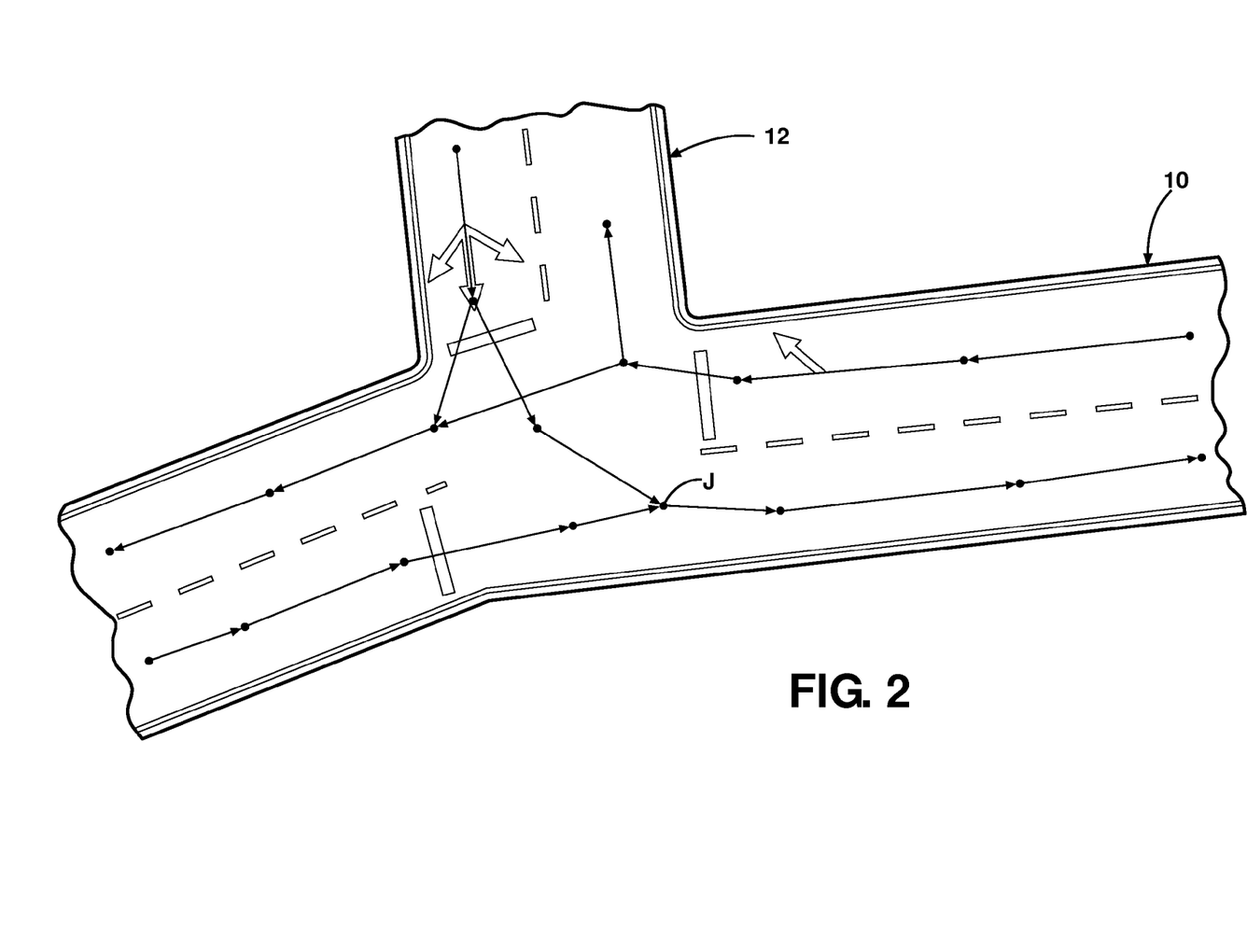
FIG. 2 is a fragmentary view of several road segments as presented in a digital map and associated with a roadway in real life comprising a main trunk intersected at a junction by a branch road.

FIG. 2 illustrates a fractional section of a digital map, in this case a by-directional roadway supporting two-way traffic. A main trunk of the roadway is indicated at 10 and a branch road extending generally perpendicularly from the main trunk 10 is indicated at 12.

It is known, for example, to take probe data inputs (i.e., time-stamped position recordings at regular intervals) from low-cost positioning systems and handheld devices and mobile phones with integrated GPS functionality for the purpose of incrementally learning a map using certain clustering technologies. The input to be processed consists of recorded GPS traces in the form of a standard ASCII stream, which is supported by almost all existing GPS devices. The output is a road map in the form of a directed graph with nodes and edges associated with travel time information. Travelers appropriately fitted with navigation devices may thus produce a trace map in the form of probe data, with nodes created at regular distances. The nodes and edges are stored in a digital map table or database. Through this technique, road geometry can be inferred and the collected probe data points refined by filtering and partitioning algorithms. For a more complete discussion of this technique, reference is made to "Incremental Map Generation with GPS Traces," Brüntrup, R., Edelkamp, S., Jabbar, S., Scholz, B., Proc. $8^{th}$ Int. IEEE Conf. on Intelligent Transportation Systems, Vienna, Austria, 2005, pages 413-418.

Figure 3:
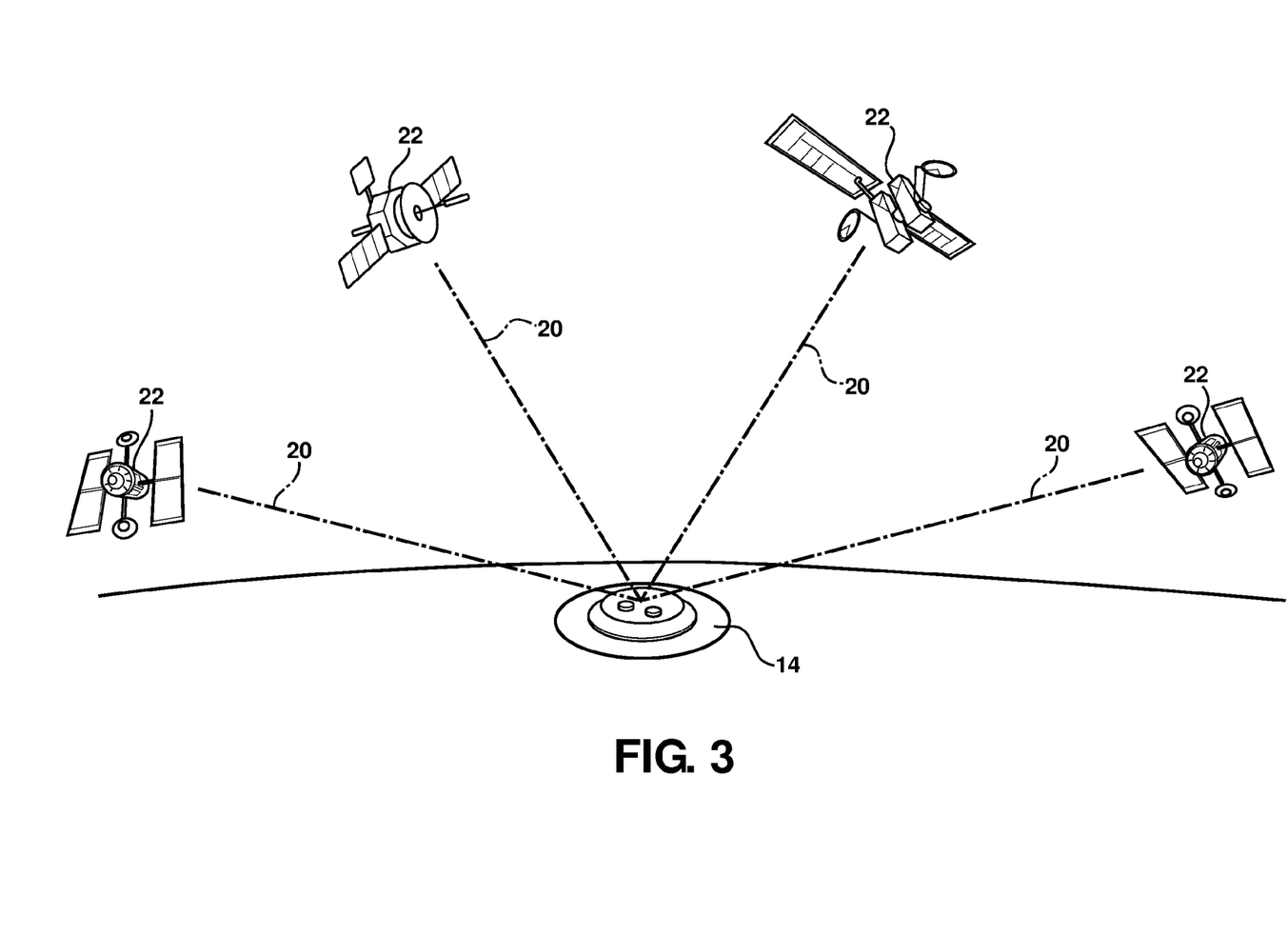
FIG. 3 shows in simplified terms a geometric configuration of GPS satellites which illustrate a generally good Dilution of Precision due to the geometry disposition of the respective GPS satellites whose radio signals are received by a particular GPS antenna.

One issue associated with such methods for generating and updating digital maps using probe data relates to certain accuracy issues associated with GPS measurements. As is well known, GPS is based on concepts of satellite ranging, wherein the distances between the GPS receiver and four or more satellites are calculated, as represented illustratively in FIG. 3. Assuming the positions of the satellites 22 are known, the location of the receiver 14 can be calculated by determining the distance from each satellite 22 to the receiver 14. Distance measurements are determined by measuring the amount of time it takes the GPS radio signal 20 to travel from the satellite 22 to the receiver 14. Radio waves travel at the speed of light. Therefore, if the amount of time it takes for the GPS signal to travel from the satellite 22 to the receiver 14 is known, the distance (distance=speed×time) can be determined. Thus, if the exact time when the signal 20 was transmitted and the exact time when it was received or known, the signal's travel time can be easily calculated.

Figures 4, 5:
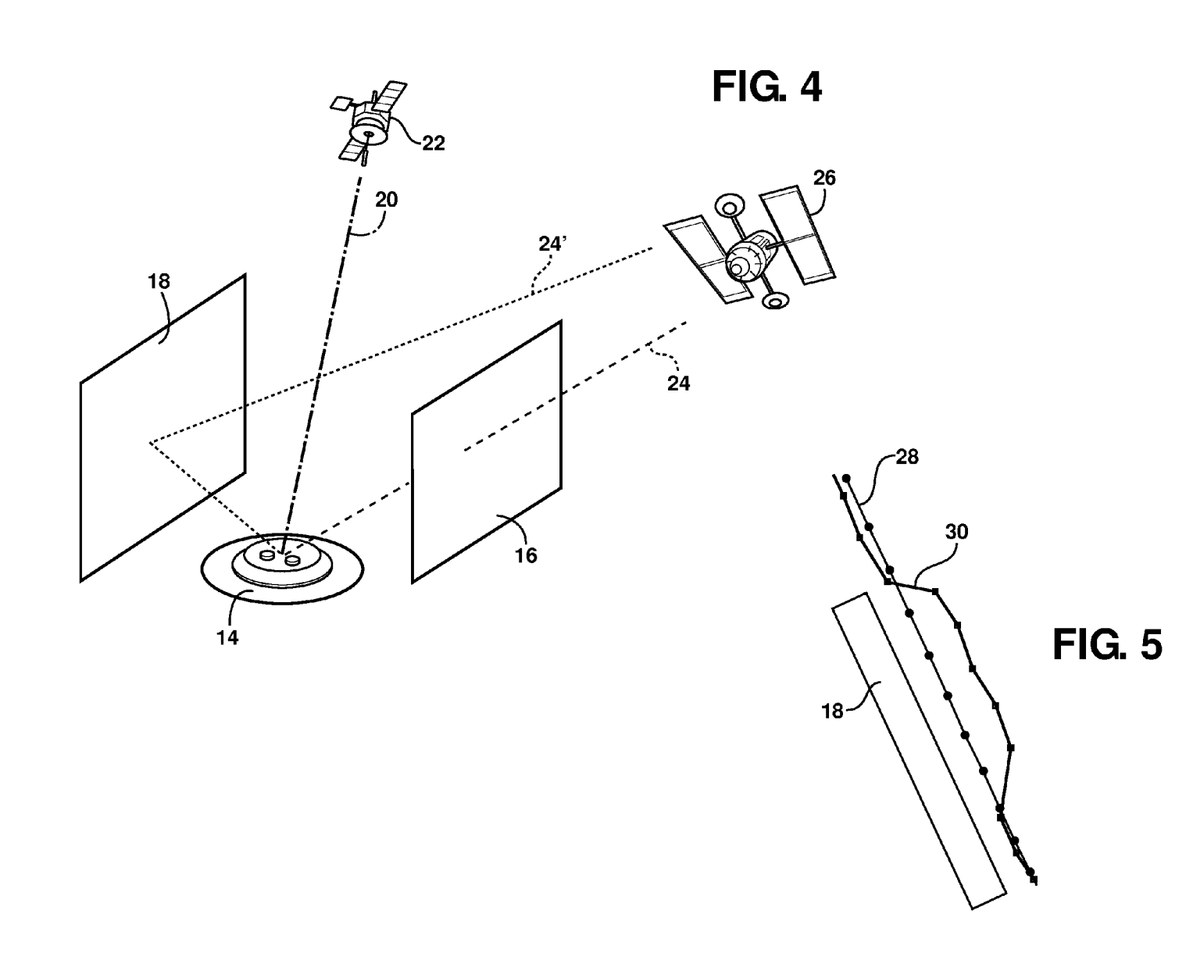
FIG. 4 is a simplified view of a GPS antenna located between two obstacles which affect the proper reception of a GPS signal from one of the satellites and thereby cause corruption of an incoming GPS signal according to the well known multi-path error.
FIG. 5 depicts a simulated representation of a GPS trace data from the antenna of FIG. 4 mapped in a digital map, wherein GPS multi-path results in an estimation of position which does not accurately track real life.
Figure 6:
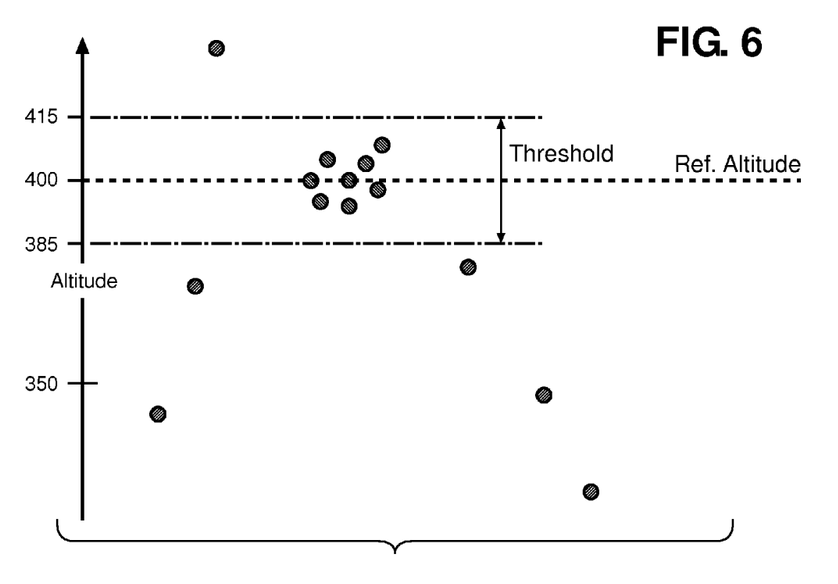
FIG. 6 is an altitude profile example illustrating that the distance between a known (reference) altitude specification and the instantaneous altitude estimate of a probe data point can be correlated with horizontal outliers detected based on their corresponding vertical altitude shifts.
Figure 7A:
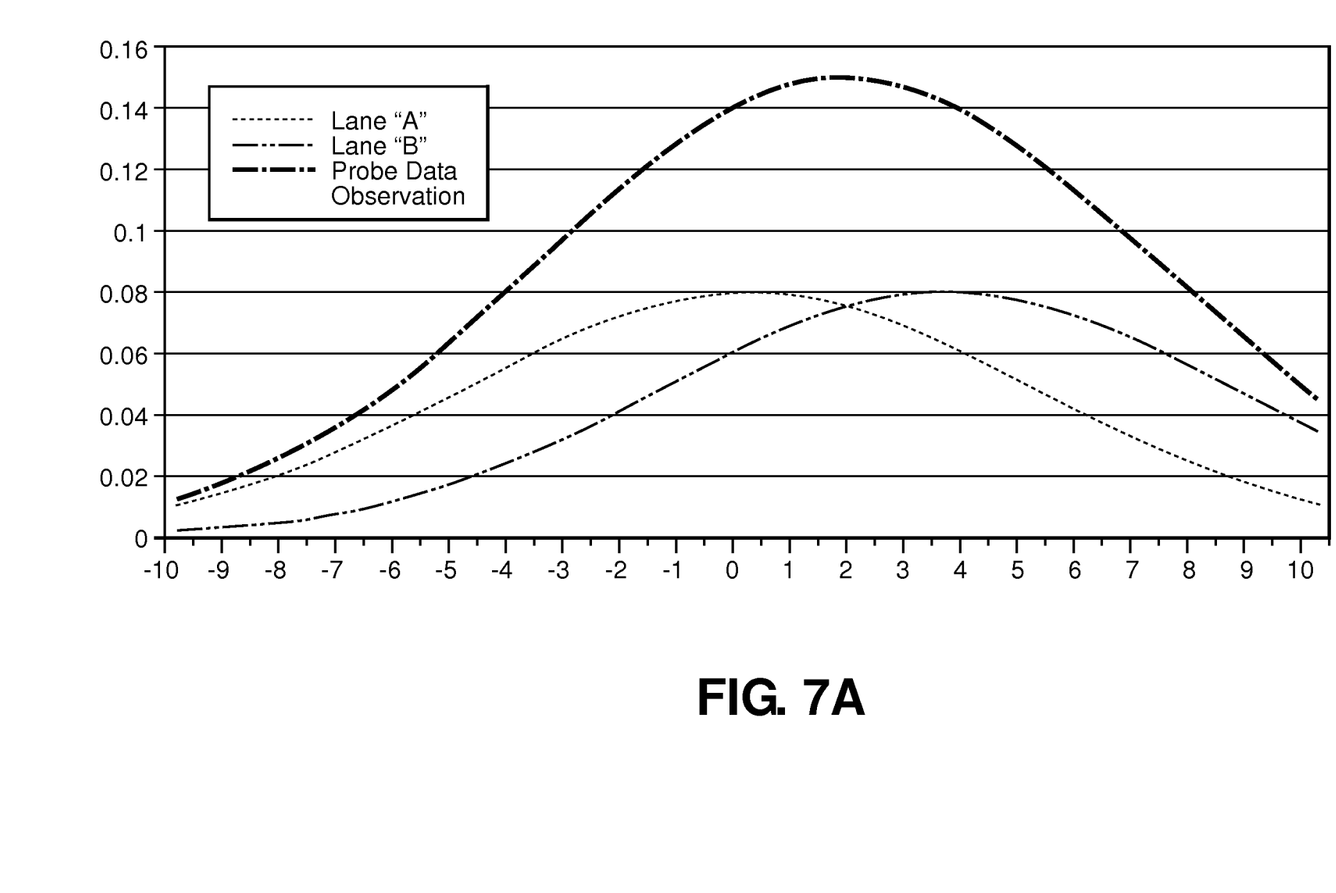
FIGS. 7A-D represent examples for different standard deviations resulting from position errors of vehicles driving on two different road segments, together with the observation of such situation out of probe data.
Figure 7B:
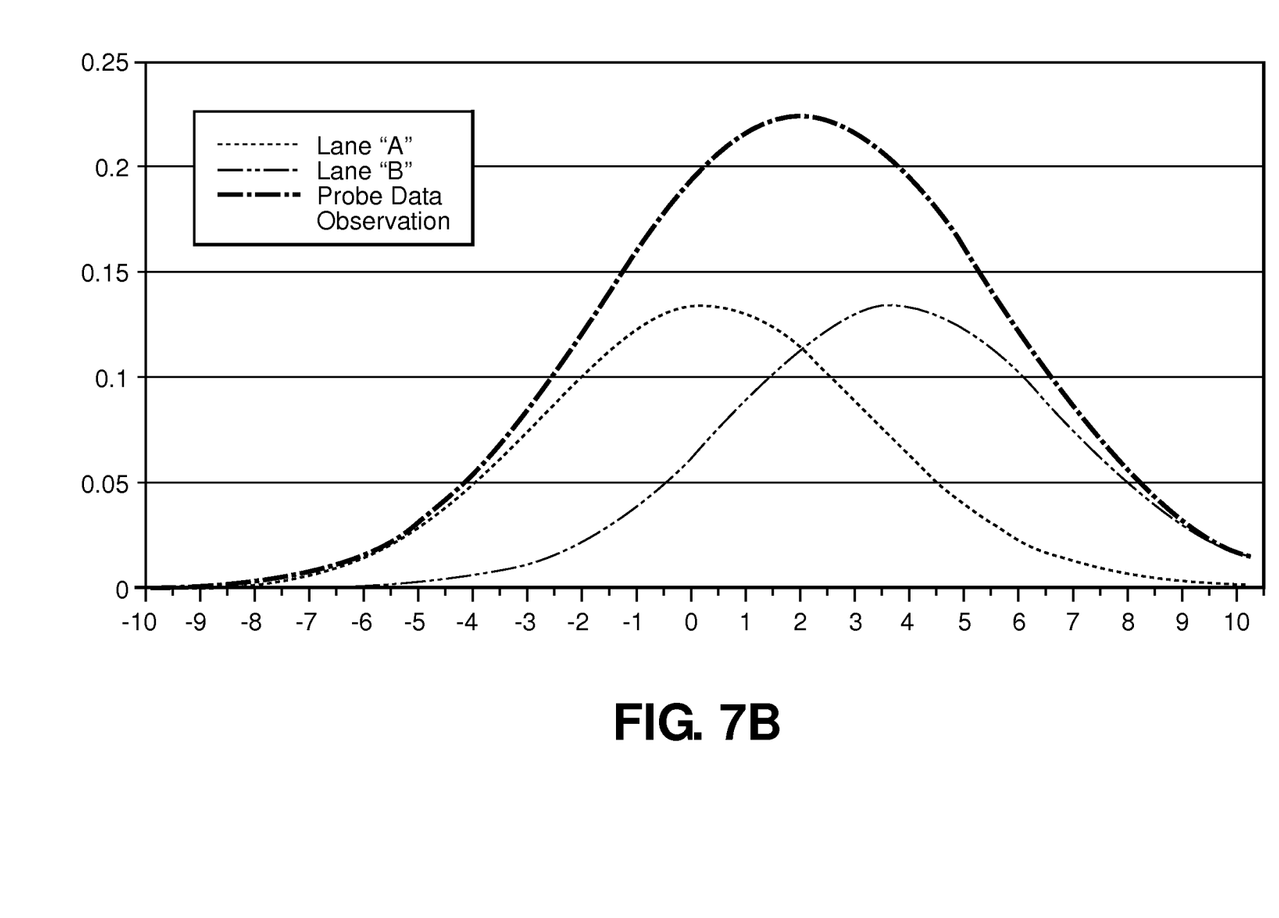
Figure 7C:
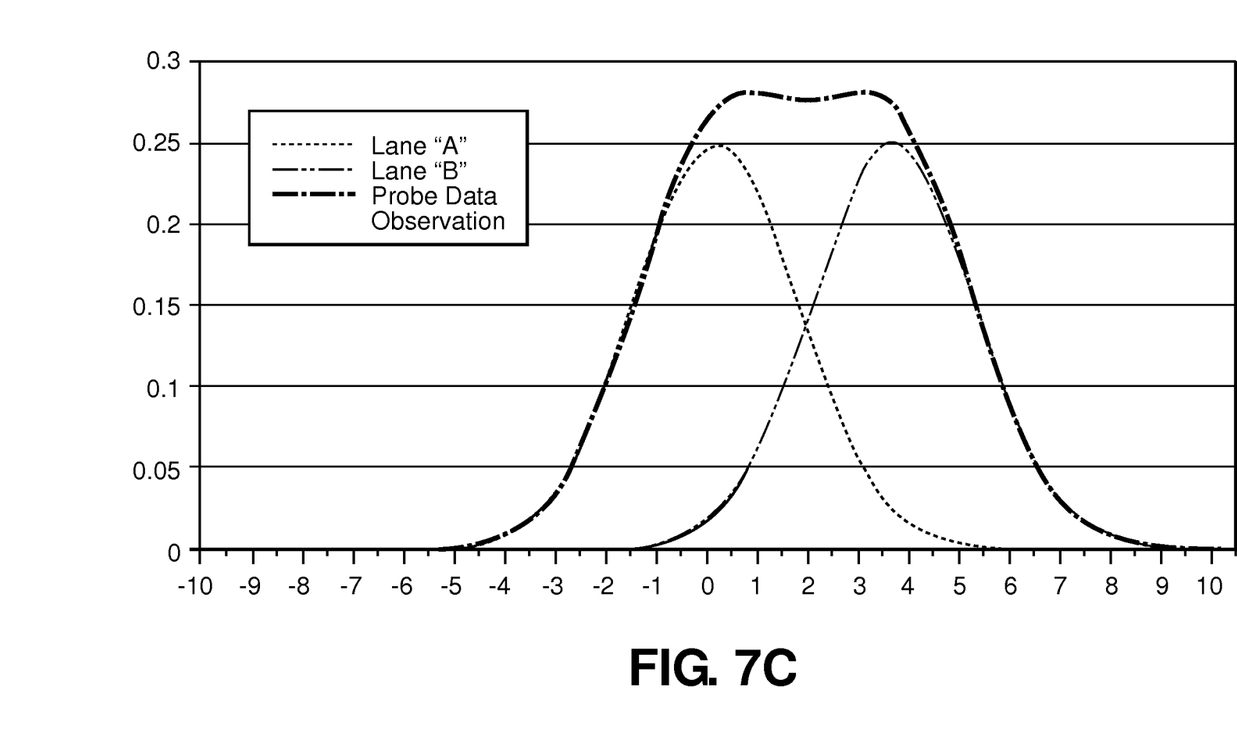
Figure 7D:
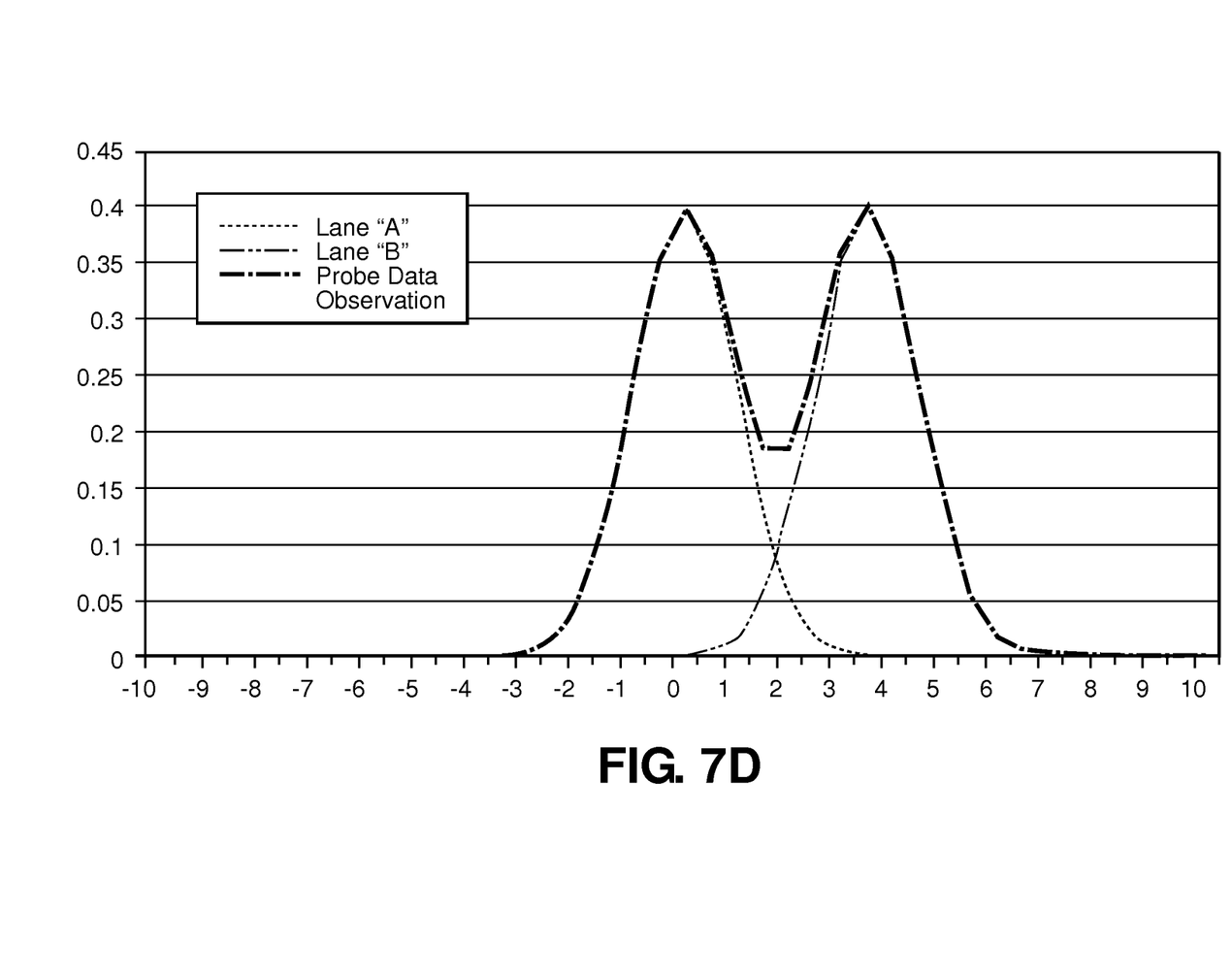

GPS systems are designed to be as nearly accurate as possible, however various factors are known to introduce errors. Added together, these errors cause deviations in the calculated position of the GPS receiver. Several sources for errors are known, some of which include: atmospheric conditions, ephemeris errors, clock drift, measurement noise, selective availability and multi-path. Multi-path error is a serious concern for GPS users. Multi-path is caused by a GPS signal 20 bouncing off of a reflective surface prior to reaching the GPS receiver antenna 14. It is difficult to completely correct multi-path error, even in high precision GPS units. FIG. 4 is a schematic view describing the multi-path phenomenon. A GPS antenna 14 is stationed between first 16 and second 18 obstacles, which may, for example, represent tall buildings in a city center environment. A GPS signal 20 from one GPS satellite 22 is received without corruption, however a signal 24 from another satellite 26 encounters the first obstacle 16 so that its signal 24 does not proceed directly to the GPS antenna 14. A corrupt signal 24' from the satellite 26, however, is reflected off the second obstacle 18 and received by the GPS antenna 14. Reflection of the corrupted signal 24' results in a situation where it takes longer for the signal 24' to reach the GPS antenna 14 than it should have. This time lag results in a perceived position shift of the GPS antenna 14 from its actual position in real life. FIG. 5 shows a sample trace path from probe data created by a personal navigation device utilizing the antenna 14. The real, actual position of the moving probe is represented by the straight line 28 and the calculated position of the GPS antenna 14 is represented by the path 30. As shown, the calculated position of the GPS antenna 14 demonstrates corruption due to the effects of multi-path.

Various techniques can be employed to counteract the effects of GPS error, including techniques related to the Dilution of Precision, or DOP. DOP is an indicator of the quality of the geometry of the satellite constellation, such as that depicted generally in FIG. 3. The computed position of the GPS antenna 14 can vary depending on which satellites are used for the measurements. Different satellite geometries can magnify or lessen the errors in the error budget. A greater angle between the satellites will lower the DOP and provide a better measurement. A higher DOP indicates poor satellite geometry, and an inferior measurement configuration. Some GPS receivers are able to analyze the positions of the available satellites and choose only those satellites with the best geometry in order to make the DOP as low as possible. With regard to multi-path, errors introduced by local reflections cannot easily be detected using DOP satellite selection techniques.

Accordingly, there is a need for an improved method to receive probe data, such as that from GPS-enabled navigation devices, for the purpose of improving existing map networks and generating new network elements in the practice of digital map making. Furthermore, there is a need for improved matching of a GPS receiver position relative to a digital map in which the negative effects of multi-path are, at least partially, counteracted.

SUMMARY OF THE INVENTION

According to this invention, a method is provided for updating a digital map using probe data received from a plurality of probes wherein unreliable probe data is identified and then culled. A digital map is provided having at least one road segment corresponding to a section of road in real life. The road segment has an altitude specification which is reliably known and indicative of the actual altitude of the corresponding road section in real life. Probe data is received from a plurality of probes that are matched to the road segment. Such received data includes altitude information. A correspondence value is calculated between the known altitude specification of the road segment and the reported altitude information for each probe matched to that road segment. Reliable probes are identified from among the plurality of probe data matched to the road segment if their calculated correspondence value is below a defined correspondence threshold. Conversely, unreliable probes are classified as those producing trace data that has a calculated correspondence value exceeding the threshold. Probe data received from the reliable probes are accepted, whereas probe data received from the unreliable probes are rejected. Only data received from the reliable probes are used to update the digital map; data from unreliable probes is not used.

According to another aspect of this invention, a method is provided for matching a mobile navigation device to a digital map using only reliable GPS data. A mobile navigation device is provided having a GPS receiver. A digital map is also provided having at least one road segment corresponding to a section of road in real life, the road segment having an altitude specification which is reliably known and indicative of the actual altitude of the corresponding road section in real life. GPS data is received in the mobile navigation device in the normal course. The received GPS data enables a calculation of an instantaneous altitude estimate. The mobile navigation device is provisionally matched to the road segment in the digital map using any suitable matching algorithm. In addition, a correspondence value is calculated between the known altitude specification of the road segment and the instantaneous altitude estimate for the mobile navigation device. The provisional match of the mobile navigation device to the road segment in the digital map is accepted if the calculated correspondence value does not exceed the correspondence threshold. However, the provisional match is rejected if the correspondence value exceeds the correspondence threshold. By this method, the mobile navigation device can confirm its coordinates relative to the digital map so as to detect possible errors such as those resulting from GPS multi-path for example.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to the Figures, wherein like numerals indicate like or corresponding parts throughout the several views, this invention pertains to navigation systems and the digital maps used by navigation systems. This invention is applicable to all kinds of navigation systems including, but not limited to, handheld devises, PDAs, mobile telephones with navigation software, and in-car navigation systems built in a vehicle. The invention can be implemented in any type of standard navigation system available on the market, as well as suitable systems which may be developed in the future. Considering in-car navigation systems as an example, like shown in FIG. 1, such devices generally comprise a determination device which may include a GPS (global positioning system) or other GNSS (global navigation satellite system) unit connected to an antenna 14 and arranged to communicate with the plurality of satellites 22, 26 so as to calculate a position from signals 20, 24 received from the satellites 22, 26. The navigation system may also deliver heading data (i.e., direction of travel) and speed of the vehicle in which it is transported. The GPS system may be a DGPS system (differential GPS) or one augmented by WAAS (wide area augmentation system) providing an accuracy of, for example, 1 σ/m (one sigma/one meter, apart from possible white noise). The GPS systems of this type are typically connected to a microprocessor and arranged to process the GPS output signals 20, 24 in the manner described previously.

Based on the signals received from the GPS system, the microprocessor determines suitable display signals to be displayed on a display device like that shown in FIG. 1 as to inform the driver where the vehicle is located relative a road network like that shown in FIG. 2, and possibly in what direction the vehicle is traveling. Moreover, in the context of the present invention, the microprocessor may be programmed to provisionally match the mobile navigation device to a particular road segment in a digital map and then to make an assessment whether the provisional match is reliable. If not reliable, the system may rely on other techniques to determine the position of the mobile navigation device, such as an axillary inertial guidance system for example. Such inertial guidance systems may also include other position determination features such as a DMI (distance measurement instrument) which is a form of odometer for measuring the distance traveled by the vehicle through the number of rotations of one or more wheels. Inertial measurement units (IMUS) may be implemented with several gyro units arranged to measure rotational accelerations, together with suitable accelerometers arranged to measure translational accelerations. The processor inside the navigation system may be further connected to a receiver of broadcast information or a digital communication network (e.g., radio RDS, DAB) or cellular GPRS/EDGE/UMTS network.

A microprocessor of the type provided with a navigation device according to this invention may comprise a processor carrying out arithmetic operations. The processor is usually connected to a plurality of memory components including a hard disk, read only memory, electrically erasable programmable read only memory, and random access memory. However, not all of these memory types need necessarily be provided. The processor is typically connected to a feature for inputting instructions, data, etc. by a user in the form of a keyboard, touch screen and/or voice converter.

The processor may further be connected to a communication network via a wireless connection, for instance the public switched telephone network (PSTN), a local area network (LAN), a wide area network (WAN), the internet, etc. by means of an input/output (I/O) device. In this mode, the processor may be arranged to communicate as a transmitter with other communication arrangements through the network. Through this arrangement, a navigation device can function as a probe relaying its determined position as computed from signals 20, 24 received from the satellites 22, 26.

When a digital map provider receives large quantities of probe data, also known as GPS traces, probe data, GPS data and the like, substantial computing resources are required to process the data and mine it for useful information. In order to reduce processing time and thereby improve the accuracy of digital maps using this received probe data, it is advantageous to create estimation techniques in which a sampling of data can be used for the purpose of updating a digital map. When this occurs, it is preferable to utilize probe data which is deemed reliable or accurate while removing or culling unreliable probe data. This process then creates a more robust estimator and one in which outliers, i.e., unreliable probe data, can be discarded. Certainly, outliers are easily identifiable in one dimensional space, yet not that simple to identify when applied to 4D or 6D problems which is often encountered when analyzing GPS probe data from multiple vehicles over time.

When reliable probe data is available, it can be used not only for accurate position determinations, but also yields better statistical analysis, and improved ability to detect specific roads and lanes, flow of traffic, etc. However, in the presence of GPS multi-path caused by buildings, mountains, trees or ionosphere, the variance of statistical GPS probe data is much higher. This leads to a need to have many more GPS probe data available to be able to calculate attributes with the required level of confidence.

Prior attempts to reduce variance in statistical GPS probe data have relied on the use of DOP (Dilution of Precision) as an estimate for GPS quality, however DOP is correlated only to the existing constellation of satellites and is not at all related to the environment of the GPS signal distribution. Therefore, relying only on DOP may solve the problem under clear sky conditions, but is not effective otherwise.

It has been observed that one of the properties of GPS multi-path is that local obstacles cause miscalculations in vertical altitude as well as horizontal positioning. Therefore, one of the principles of this invention relies on the observed correlation between vertical altitude and horizontal displacement shifts when GPS multi-path is present. Accordingly, it is possible to detect horizontal outliers in the set of GPS probe data using the distance to a reference altitude source data. In other words, it is possible to utilize the fact that a digital navigation device, particularly one used in a motor vehicle, is driving on the surface of a road segment, whose altitude specification may be reliably known from external sources like DTM, Lindar Point Cloud or other suitable sources. Taken together with the observation that altitude error is highly correlated with latitude and longitude error in GPS when multi-path effects are present, it is possible to compare altitude value of GPS probe data with the so called "ground truth" from external sources so as to identify outliers and therefore consider only probes which have a significantly reduced variance. These latter probes can be deemed reliable whereas the outliers are classified as unreliable. Thus, by finding outliers in one dimension (altitude data) large numbers of unreliable probes (outliers) can be efficiently eliminated in other dimensions based on the correlated phenomena of altitude error and x, y error resulting from multi-path effects.

Methods associated with this invention are used in connection with updating digital maps using probe data received from a plurality of probes. In a situation where a digital map contains a road segment having a known altitude specification, probe data received from a plurality of probes can be matched to the road segment using any suitable matching technique. Such received data can include or be used to calculate an instantaneous altitude estimate using known signal processing algorithms and techniques. From this, a correspondence value can be calculated between the known altitude specification of the road segment and the reported altitude information for each probe that is matched to the road segment. A sample correspondence algorithm may take the following form: $|Alt_{probe} - Alt_{official}|$.

A correspondence threshold (e.g., $thresh_{Alt}$) will be determined for the altitude specification. Applying a simple algorithm, e.g., $|Alt_{probe} - Alt_{official}| < thresh_{Alt}$ it is possible to calculate whether a particular probe is reporting its altitude at an unrealistic elevation. This threshold may be, for example, 15 meters like that shown in FIG. 7 where the referenced altitude source is 400 meters for the particular road segment of concern. Thus, a correspondence threshold of plus/minus 15 meters is established. Reliable probes can be identified from among the plurality of probes matched to the road segment by those whose calculated correspondence value does not exceed the correspondence threshold. Thus, the congregation of probe data points clustered near the reference altitude (400 meters) and inside the threshold limits are deemed reliable, whereas those above and below are classified as unreliable outliers and their data is disregarded. Only probe data from the reliable probes are deemed acceptable and used to update the digital map.

Of course, rather than establishing a static or fixed threshold such as plus/minus 15 meters, the correspondence threshold can be dynamically variable. For example, the correspondence threshold may be lower or smaller for high density traffic areas and larger for lower density areas. Alternatively, the threshold may vary depending upon the value of the reference altitude specification. Of course, other factors may be used to control variance of a dynamic threshold under appropriate circumstances. By way of example, experimental results have suggested that threshold values in the plus/minus 15 meter range is adequate to lower GPS probe data variance by 2 standard deviations in downtown areas. Such results can be obtained even from using altitude specification source data from readily available and inexpensive digital terrain model (DTM) source data.

Thus, the method of this invention operates by creating a subset of GPS probe data which is considered reliable in that it has a lower variance. This subset of reliable data is created from received probe data that has certain x, y coordinates determined from GPS signals. An altitude difference value, i.e., correspondence value, can be calculated using an altitude specification from any available source data. If the altitude difference is outside of a defined threshold, that particular GPS probe data is marked as invalid or unreliable and thereby not used for the purpose of updating digital maps.

One important issue in extracting information from GPS probe data relates to answering the question which road segment or lane a particular probe vehicle happened to be driving on when the data was transmitted. By statistical laws, resolution of probe data will be two times larger that the standard deviation of probe data. This means that no matter how big the sample of data is, one can get no higher than two sigma. Therefore, for an example one will not be able to tell how many lanes there are if standard deviation of the probe data is larger than 1.75 meters (assuming lane width is 3.5 meters). In other words, the resolution cannot be increased by simply increasing the number of probe data points collected. To better illustrate this phenomenon, FIGS. 7A-D represent examples for different standard deviations. In each example, the lighter broken lines represent distribution of position error of motor vehicles driving on two different paths (segments, parallel roads, single/dual carriage ways, lanes, etc.). The heavy broken line overarching these represents the observation of such situation out of the probe data. The standard deviations values for FIGS. 7A-D are respectively: 1.5, 1.0, 0.5 and 0.3 of the needed signal separation. Thus, it will be observed that a resolution higher than 2σ (two sigma) will be completely ineffective to indicate the number of lanes.

Figure 8:
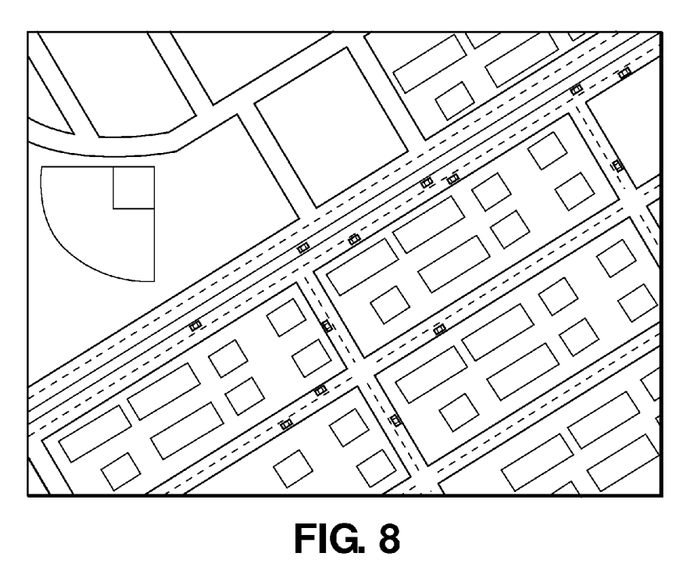
FIG. 8 shows an example of a tile in a digital map wherein a particular divided lane roadway (two lanes each direction plus one center turn lane) extends diagonally from the lower left to the upper right corner of the tile.
Figure 9:
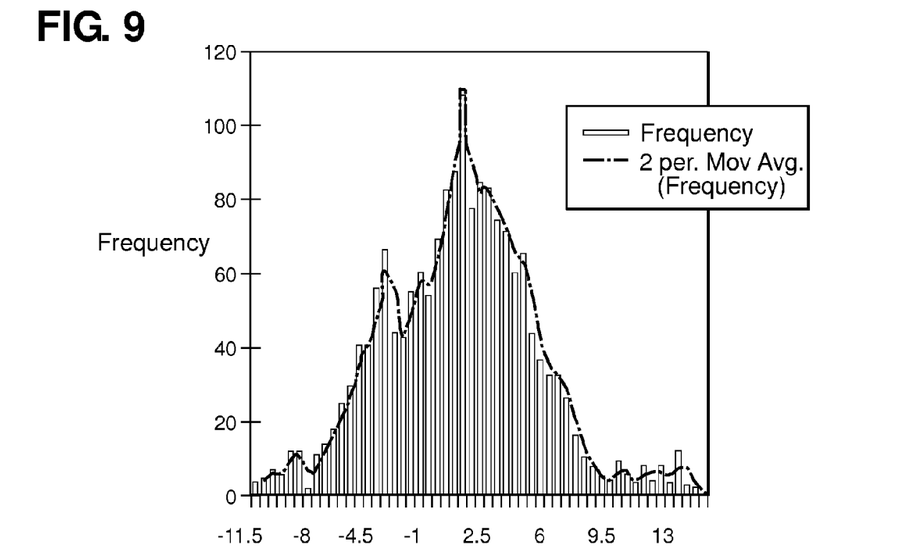
FIG. 9 is a histogram plotting probe data collected from probes traversing the multi-lane roadway of FIG. 8 and presented in a raw, unfiltered condition generally showing two peaks approximately eight meters apart.

The subject invention, however, is effective at addressing the above-noted dilemma. Take, for example, the map tile represented in FIG. 8, wherein a five lane roadway cuts diagonally from the lower left to upper right corners of the tile. This multi-lane roadway includes two lanes carrying traffic in one direction, two lanes carrying traffic in the opposite direction, and a center turn lane. Thus, five distinct lanes of traffic are represented. The sample study collecting probe data from vehicles traveling this particular roadway is represented by way of the histogram in FIG. 9. This depiction represents the probe data prior to filtration using the techniques described above and shows, at best, two peaks separated by approximately eight meters away from each other. The S/N ratio represented here is particularly poor (2.25).

Figure 10:
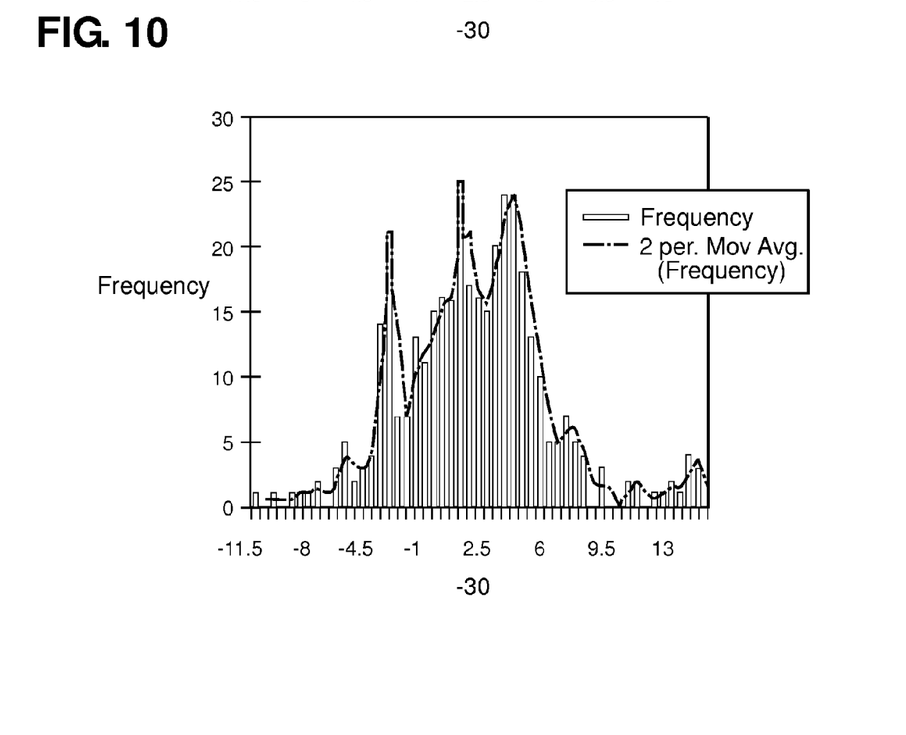
FIG. 10 is a view as in FIG. 9 but using only probe data accepted from reliable probes such that three peaks can be clearly discerned situated four meters and three meters from each other.

FIG. 10 shows a filtered histogram using principles of this invention, i.e., using only probe data identified as reliable because its altitude information fell within an acceptable correspondence threshold. Thus, replotting this data on the same histogram format yields substantially more useful results. Here, three peaks clearly emerge situated four meters and three meters from one another. These peaks represent the perspective left through lane, right through lane and center turn lane. S/N ratios are calculated at 8.16 for the center turn and 3.18 for the left through lane.

Figure 11:
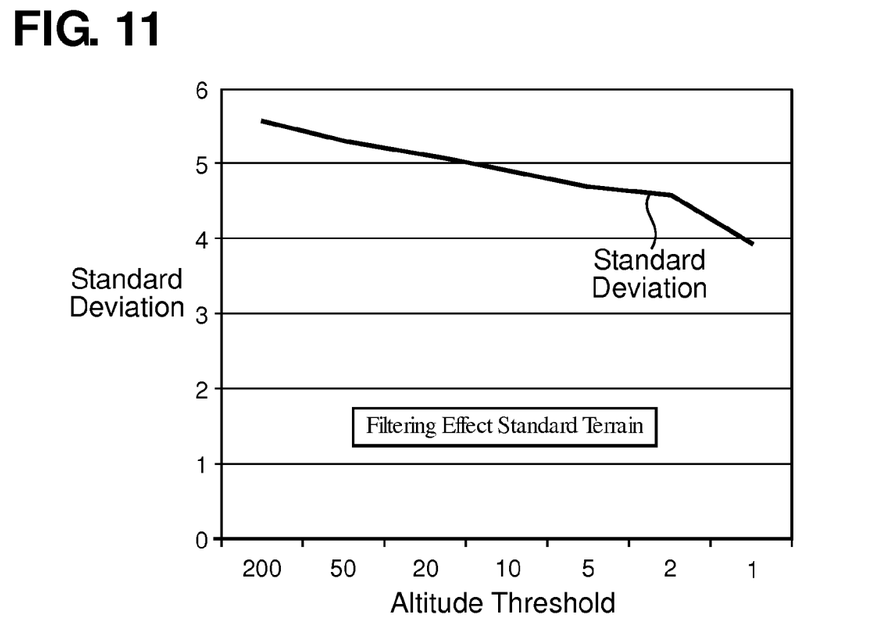
FIG. 11 is a graph illustrating the effect of filtering out unreliable probe data over standard terrain.
Figure 12:
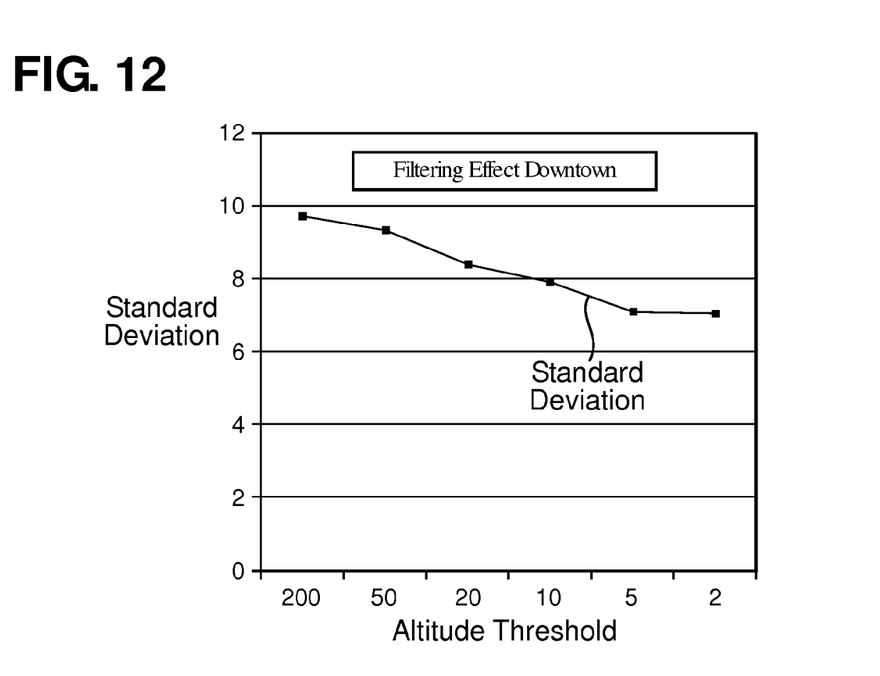
FIG. 12 is a view as in FIG. 11 but showing the filtering effects of the subject invention upon probe data collected from probes from downtown and city center locations.

Such attention to the altitude references from collected probe data can also be used to lower standard deviation to levels which allow capturing parallel roads. For example, using DTM data, which typically has an accuracy of ten meters, it is possible to lower the standard deviation of the probe data below five meters. An example of this in regard to the filtering effects over standard terrain can be observed by reference to the graph presented in FIG. 11. Likewise, the altitude reference can be used to lower the standard deviation in city/downtown situations as well. A typical standard deviation in the city center can typically have a very high value (e.g., in downtown Ottawa the measured standard deviation was about ten meters in some locations thus, a standard deviation of 7 can be achieved using DTM source data accurate within 15 meters. Those of skill and the art will readily appreciate the advantages which can be obtained by implementing the principles of this invention.

Figure 13:
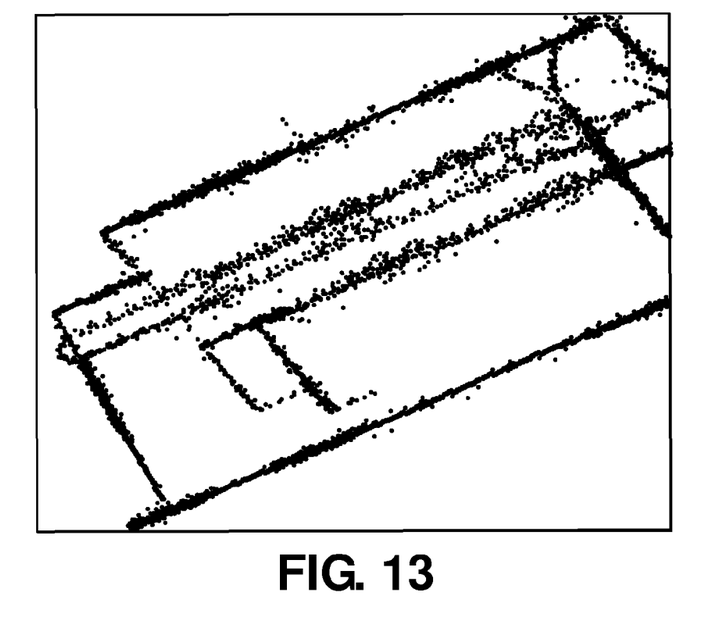
FIG. 13 is an example of raw probe data collected from a downtown, city-center area of Ottawa, Canada.
Figure 14:
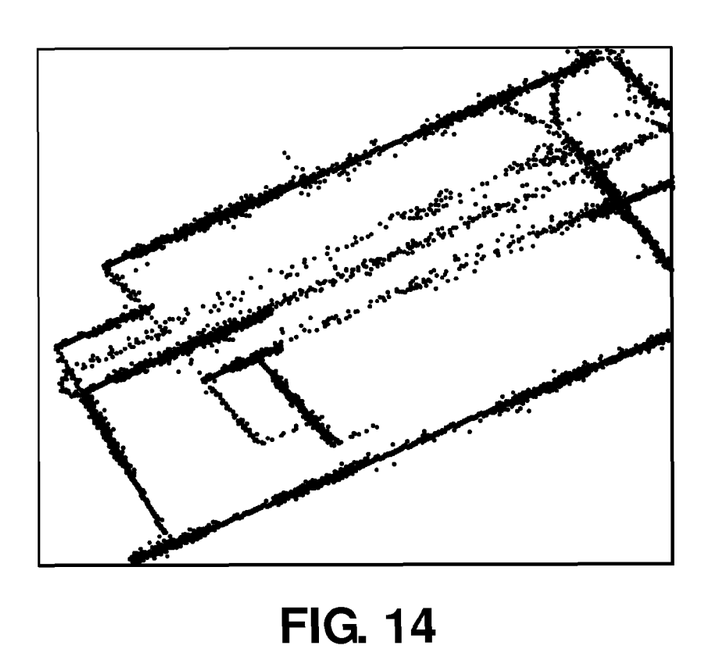
FIG. 14 is a view as in FIG. 13 but showing the same example using only reliable probe data points and excluding unreliable probe data points determined by the altitude error principles of this invention.

Another example applied from actual test data may be observed by reference to FIGS. 13 and 14 which represent a city center section of downtown Ottawa, Canada. FIG. 13 illustrates the x, y placement of received probe data from a plurality of probes matched to the various road segments shown in the tile. In this case, particularly in the region of the three closely spaced parallel road segments appearing in the center of the tile, probe data is particularly shifted due, most likely, to the effects of GPS multi-path. By applying the filtering techniques of this invention such that reliable probe data is identified through application of a comparison between calculated altitude and official altitude specifications provided for the various road segments, the data can be refined and presented in the manner shown in FIG. 14 whereby positional errors can be lowered to approximately ten meters and thereby substantially improve the data. Such improved data enables more accurate updating of digital maps, as well as better information concerning traffic patterns, densities and the like.

Figure 15:
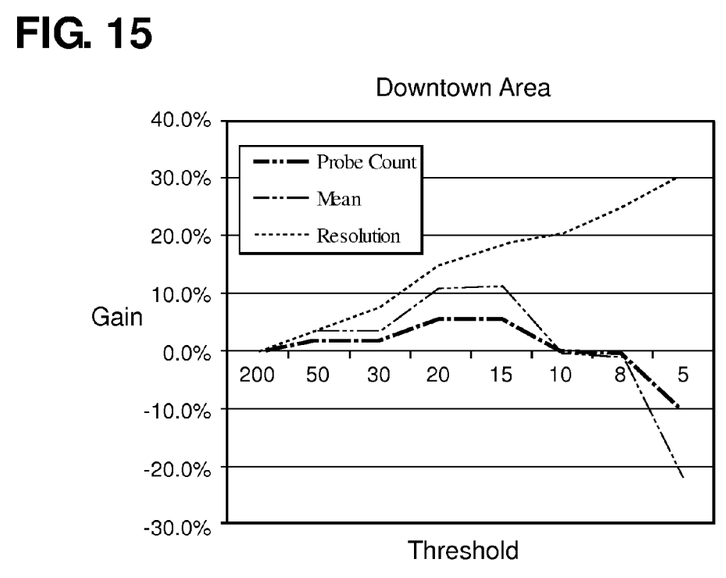
FIG. 15 is a plot of gain versus threshold for probe data collected in a downtown area and illustrating the calculated mean and resolution.
Figure 16:
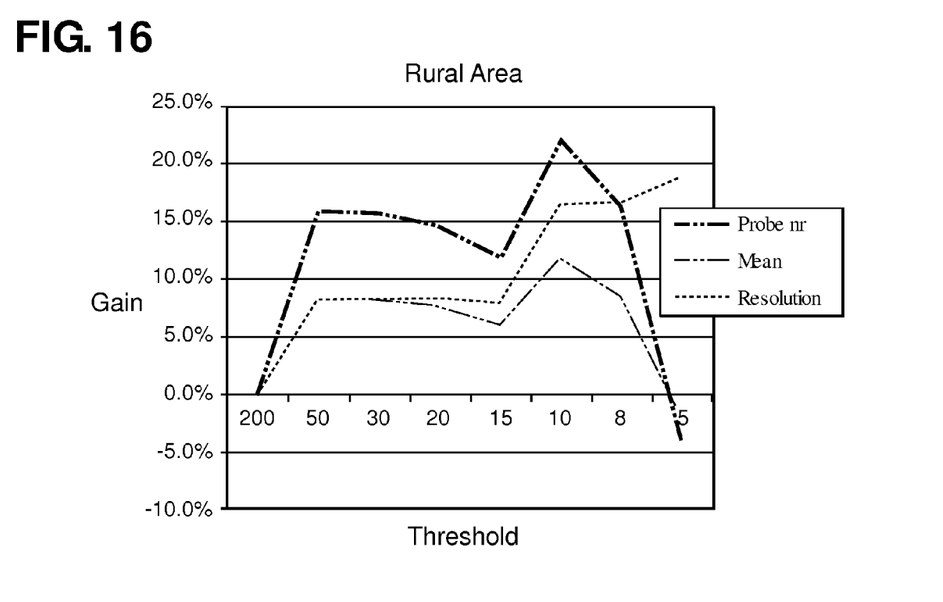
FIG. 16 is a view as in FIG. 15 presenting similar probe data collected in a rural area.

FIGS. 15 and 16 demonstrate how such altitude reference can be used to lower the standard error of the mean (SEM) for the same number of probe data. Standard error of the mean is useful to indicate the uncertainty of the position of lane or road segment center lines. The standard error of the mean is the standard deviation of those sample means over all possible samples drawn from a population. The standard error of the mean can also refer to an estimate of that standard deviation, computed from the sample of data being analyzed at the time. Thanks to this approach, additional gains realized through application of this invention will include faster map updates because a smaller population of probe data can be used to have the same results as a very large number of data. Additionally, less computational power is needed to analyze the probe data. This is thanks, in large part, to an easily implemented up-front altitude filter which, in relative terms, is computationally inexpensive compared to further analysis of large quantities of probe data. Furthermore, if filtering is configured to take place within the navigational device itself, such as within its microprocessor, a lower transfer rate can be observed between server and probes because only reliable probe data will be transmitted.

An extension of this concept can be used to estimate the so-called "known altitude" for a particular road segment directly from collected probe data. In other words, if the altitude of a given road segment is not reliably known, the altitude can nevertheless be derived using a statistical averaging or other accepted estimating technique. As such the probes by themselves create a kind of negative feedback loop, allowing previously unknown altitude information to be derived. A large enough population of recorded probe traces will enable a reliable calculation of the local altitude with a probability or certainty factor that can be determined.

Another interesting application of this concept can be implemented to improve the accuracy at which a particular navigation device is mapped or matched to a road segment in a digital map. Of course, many map matching algorithms have been proposed in which GPS signal data is used to place a particular navigation device within the context of a digital map. Naturally, if errors in the GPS signal are present, such as by GPS multi-path, the matching of the navigation device can be flawed. Using the principles of this invention, a mobile navigation device can make a provisional match to a particular road segment in the digital map. The navigation device can further calculate a correspondence value between the known altitude specification of the road segment associated with the provisional match and the instantaneous altitude estimate made by the navigation device. If the calculated correspondence value does not exceed a defined threshold, then the provisional match to the road segment can be accepted and the navigation device will assume that GPS multi-path effects are not involved. However, if the calculated correspondence value exceeds the threshold, the provisional match is rejected. Under the latter circumstances, the navigation device can revert to auxiliary guidance methods such as those described above, and which may include inertial guidance, or other techniques. Alternatively, or in addition to, indications of a bad provisional match can prompt the navigation device to analyze for the presence of bad satellites. Bad satellites, of course, are those which cause the altitude to be erroneous due to poor DOP or multi-path. See, for example, satellite 26 in FIG. 4. When bad satellites are identified, their signal can be simply disregarded and a new position calculated based on only good satellites 22.

Referring now to FIGS. 15 and 16, it is shown that overall analysis of this method leads to increase in resolution proportionally to the accuracy of the official source data (e.g. DTM). While gain in the SEM reaches its maximum at threshold of altitude around 15 meters. This is due to the fact that the number of probes that do not pass the correspondence analysis increases faster than gains in standard deviation. To overcome these effects, a weighted averaging method may be used as a more robust estimator.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for updating a digital map using probe trace data received from probes wherein unreliable probe data is culled, said method comprising the steps of:

providing a digital map having at least one road segment corresponding to a section of road in real life, the road segment having an altitude specification which is reliably known and indicative of the actual altitude of the corresponding road section in real life;

receiving probe data from at least one probe matched to the road segment, the received data including or enabling derivation of altitude information;

calculating a correspondence value between the known altitude specification of the road segment and the reported altitude information for the probe matched to the road segment;

defining a correspondence threshold for the altitude specification;

identifying the matched probe as reliable if the calculated correspondence value does not exceed the correspondence threshold, and classifying the matched probe as unreliable if the calculated correspondence value exceeds the correspondence threshold;

accepting probe data received from a reliable probe while rejecting probe data received from an unreliable probe; and updating the digital map using probe data received from a reliable probe but not from an unreliable probe.

2. The method of claim 1 wherein said step of defining a correspondence threshold includes applying a dynamically variable threshold.

3. The method of claim 1 wherein said step of updating the digital map includes altering the display screen of a personal navigation device.

4. The method of claim 1 wherein said step of updating the digital map includes filtering the probe data to find lane information.

5. The method of claim 4 wherein said step of filtering the probe data to find lane information includes analyzing a cross section histogram of the probe data for peaks to determine the number of discrete lanes in the road.

6. The method of claim 5 wherein said step of updating the digital map includes manipulating the proportions of the peaks to adjust the centerline estimation.

7. The method of claim 1 wherein said step of updating the digital map includes capturing parallel roads.

8. The method of claim 1 further including the step of using a weighted mean averaging method to classify as unreliable a probe having a calculated correspondence value exceeding the correspondence threshold.

9. The method of claim 1 wherein said step of receiving probe data includes transporting the at least one probe in a motor vehicle over the road segment.

10. A method for matching a mobile navigation device to a digital map using only reliable GPS data, said method comprising the steps of:
    providing a mobile navigation device having a GPS receiver;
    providing a digital map having at least one road segment corresponding to a section of road in real life, the road segment having an altitude specification which is reliably known and indicative of the actual altitude of the corresponding road in real life;
    receiving GPS data in the mobile navigation device, the received GPS data including or enabling the calculation of an instantaneous altitude estimate;
    provisionally matching the mobile navigation device to the road segment in the digital map;
    calculating a correspondence value between the known altitude specification of the road segment and the instantaneous altitude estimate for the mobile navigation device;
    defining a correspondence threshold for the altitude specification; and
    accepting the provisional match to the road segment if the calculated correspondence value does not exceed the correspondence threshold, and rejecting the provisional match to the road segment if the calculated correspondence value exceeds the correspondence threshold.

11. The method of claim 10 wherein said step of rejecting the provisional match further includes calculating the position of the mobile navigation device based on an auxiliary inertial guidance system.

12. The method of any of claim 10 wherein said step of rejecting the provisional match further includes analyzing the satellite signal for the presence of one or more bad satellites which cause the reported altitude to be erroneous, and then calculating a new position based on the remaining (good) satellites.

13. The method of claim 10 wherein the mobile navigation device includes a display screen, and wherein said step of accepting the provisional match to the road segment includes altering the display screen of a personal navigation device.

14. A motor vehicle incorporating a mobile navigation device and implementing the method of claim 1.

15. A method for estimating the altitude of a road segment in a digital map using probe trace data, said method comprising the steps of:
    providing a digital map having at least one road segment corresponding to a section of road in real life, the road segment having an unknown or unreliable altitude specification;
    receiving probe data from a plurality of probes matched to the road segment;
    deriving an altitude estimate from the probe data for each probe;
    combining the altitude estimates from the plurality of probes;
    calculating a probable altitude specification for the road segment from the combined altitude estimates; and
    updating the digital map to include the probable altitude specification as an attribute associated with the road segment.

* * * * *